(12) United States Patent
Liencres

(10) Patent No.: US 6,636,518 B1
(45) Date of Patent: Oct. 21, 2003

(54) SYNCHRONIZING SOURCE-SYNCHRONOUS LINKS IN A SWITCHING DEVICE

(75) Inventor: Bjorn O. Liencres, Palo Alto, CA (US)

(73) Assignee: Juniper Networks, Mountain View, CA (US)

(*) Notice: Subject to any disclaimer, the term of this patent is extended or adjusted under 35 U.S.C. 154(b) by 0 days.

(21) Appl. No.: 09/129,261

(22) Filed: Aug. 4, 1998

Related U.S. Application Data

(63) Continuation-in-part of application No. 08/844,171, filed on Apr. 18, 1997, now Pat. No. 5,905,725, and a continuation-in-part of application No. 08/767,576, filed on Dec. 16, 1996, now Pat. No. 5,909,440.

(51) Int. Cl.$^7$ .................................................. H04J 3/06
(52) U.S. Cl. ...................... 370/395.7; 370/503; 370/412
(58) Field of Search ................................. 370/503, 507, 370/508, 509, 516, 395.7, 395.71, 395.72, 412, 419, 422, 423, 425; 375/356–371, 372, 373

(56) References Cited

U.S. PATENT DOCUMENTS

| | | | |
|---|---|---|---|
| 4,603,416 A | | 7/1986 | Servel et al. .................. 370/60 |
| 4,922,438 A | | 5/1990 | Ballweg .................... 370/85.15 |
| 4,933,932 A | * | 6/1990 | Quinquis et al. ............ 370/415 |
| 4,984,251 A | * | 1/1991 | Perloff et al. .................. 375/38 |
| 5,185,863 A | * | 2/1993 | Hamstra et al. ............. 395/250 |
| 5,222,229 A | * | 6/1993 | Fukuda et al. ............... 709/400 |
| 5,471,466 A | | 11/1995 | Cooperman ................ 370/58.1 |
| 5,621,775 A | * | 4/1997 | Etienne ........................ 375/372 |
| 5,719,862 A | * | 2/1998 | Lee et al. .................... 370/355 |
| 5,742,600 A | * | 4/1998 | Nishihara ................... 370/395 |
| 5,761,203 A | * | 6/1998 | Morales ...................... 370/418 |
| 5,905,725 A | | 5/1999 | Sindhu et al. .............. 370/389 |
| 5,909,440 A | | 6/1999 | Ferguson et al. ........... 370/389 |
| 5,978,868 A | * | 11/1999 | Maas .......................... 710/52 |
| 6,072,741 A | * | 6/2000 | Taylor ........................ 365/219 |
| 6,335,931 B1 | * | 1/2002 | Strong et al. ............... 370/390 |
| 6,426,953 B1 | * | 7/2002 | Benayoun et al. ....... 370/395.1 |

FOREIGN PATENT DOCUMENTS

WO  WO 96/42158  12/1996

OTHER PUBLICATIONS

Bregni, "A Historical Perspective on Telelcommunications Network Synchronization", IEEE Communications Magazine, 6/98, vol. 36, No. 6, pp. 158–166.

* cited by examiner

Primary Examiner—Min Jung
(74) Attorney, Agent, or Firm—Harrity & Snyder, LLP

(57) ABSTRACT

A method and apparatus for synchronizing components operating isochronously that are coupled by independent links. The apparatus includes a synchronization circuit having a first and second buffer, each including an input port coupled to an external link, an output port, a read pointer and a write pointer. The read pointer indicates a next location in a respective buffer to be read in transferring data out on the output port. The write pointer indicates a next location in the respective buffer to be written when receiving data on the input port and is configured to automatically increment upon receipt of a first data bit on a respective external link. A trigger circuit is coupled to each link for receiving external trigger signals. Each external trigger signal is included along with data transmitted on the link and indicates when data is present on a respective link. A counter is coupled to the trigger circuit. The counter includes a trigger input and a predefined delay period. After receipt of a first of the external trigger signals on the trigger input, the counter is operable to output a read enable signal to each of the read pointers after the delay period has expired.

19 Claims, 15 Drawing Sheets

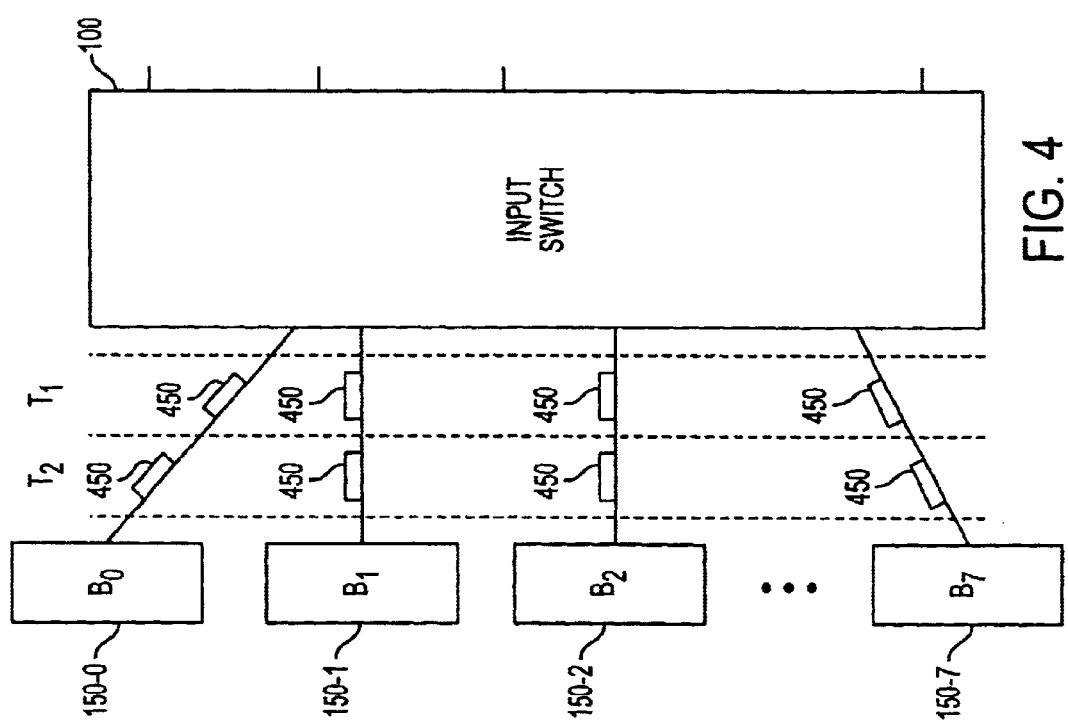

SYNCHRONIZING SOURCE-SYNCHRONOUS LINKS IN A SWITCHING DEVICE

This application is a continuation-in-part of U.S. application Ser. No. 08/844,171, filed Apr. 18, 1997, now U.S. Pat. No. 5,905,725, which is incorporated in its entirety by reference.

BACKGROUND

The present invention relates generally to data routing systems, and more particularly to methods and apparatus for efficiently routing packets through a network.

In packet switched communication systems, a router is a switching device which receives packets containing data or control information on one port, and based on destination information contained within the packet, routes the packet out another port to the destination (or an intermediary destination).

Conventional routers perform this switching function by evaluating header information contained within a first data block in the packet in order to determine the proper output port for a particular packet.

Efficient switching of packets through the router is of paramount concern. Referring now to FIG. 1, a conventional router includes a plurality of input ports 2 each including an input buffer (memory) 4, a switching device 6 and a plurality of output ports 8.

Data packets received at an input port 2 are stored at least temporarily, in input buffer 4 while destination information associated with each packet is decoded to determine the appropriate switching through the switching device 6. The size of input buffer 4 is based in part on the speed with which the destination information may be decoded. If the decoding process takes too long as compared to the rate at which packets are received, large sized memory elements may be required or packets may be dropped.

The transfer of data between components in an electrical device, such as a router, often requires some form of synchronization. Synchronization may be achieved by operating devices on the same clock signal, or by providing clocking signals along with each data transfer. Data transfers between subsystems (e.g., between an input port 2 and input buffer 4 or between the input buffer 4 and switching device 6) within a router may be synchronous, source synchronous, asynchronous or isochronous.

Two subsystems in electrical device are characterized as synchronous when each makes use of a common clock signal, for example, to clock logic gates. To be synchronous, both the frequency and phase of the common clock signal at the respective subsystem is the same. Accordingly, where the clock signal is generated externally, delays in reaching each of the subsystems must be matched to maintain the phase relationship.

Conversely, two subsystems are characterized as asynchronous when each uses independent clock signals.

Source synchronous communications are characterized by the transfer of a clock signal along with a data signal when communicating between subsystems. The first subsystem operates in accordance with a first clock signal. Data passed between the first subsystem and a second subsystem is accompanied with a clock signal. The clock that accompanies the data may be the first clock signal or may be derived from the first clock signal. The second subsystem uses this clock signal to process (clock in) the received data into the second subsystem.

Two subsystems are characterized as isochronous when both subsystems use a clock having the same frequency but not necessarily the same phase. The clocks may be externally generated (outside the respective subsystems) but are not required to be delay matched.

The transfer of data through a router often requires the use of source synchronous communication links. Source synchronous communication links include clock and data signals to allow the various components of the router to control the flow of information through the device. However, the use of source synchronous communication links increases the bandwidth required to transfer data between the components.

SUMMARY OF THE INVENTION

In general, in one aspect, the invention provides a synchronization circuit for synchronizing components operating isochronously that are coupled by independent links. The synchronization circuit includes a first and second buffer, each including an input port coupled to an external link, an output port, a read pointer and a write pointer. The read pointer indicates a next location in a respective buffer to be read in transferring data out on the output port. The write pointer indicates a next location in the respective buffer to be written when receiving data on the input port and is configured to automatically increment upon receipt of a first data bit on a respective external link.

A trigger circuit is coupled to each link for receiving external trigger signals. Each external trigger signal is included along with data transmitted on the link and indicates when data is present on a respective link.

A counter is coupled to the trigger circuit. The counter includes a trigger input and a predefined delay period. After receipt of a first of the external trigger signals on the trigger input, the counter is operable to output a read enable signal to each of the read pointers after the delay period has expired.

Aspects of the invention include numerous features. The data transmitted over a data portion of the link is the trigger signal.

In another aspect, the invention provides a method for synchronizing components operating isochronously that are coupled by independent links. The method includes providing a synchronization signal from a first component to a plurality of second components through independent first links. Upon detection of the synchronization signal at a respective second component, an acknowledgment signal is returned from each of the second components to the first component through one of a like plurality of second links. When all the acknowledgment signals have been returned, the transmission of the synchronization signal from the first component to the plurality of second components is terminated. Upon detecting the termination of the synchronization signal at each second component, data transfer on the second links is initialized.

Aspects of the invention include numerous features. The first component can be a switch in a router and the second components are input ports for receiving data from a network.

Among the advantages of the invention are one or more of the following. Synchronization of different subsystems is realized without requiring a synchronous interconnect. Multiple subsystems can be synchronized to one common subsystem. Synchronization can be achieved using in-band data so that no additional interconnects are required. Mutual synchronization between two subsystems can be realized (from a first system to a second system and then from the second system back to the first system). Synchronization of multiple subsystems can be achieved out of order. A dependent synchronization of a first subsystem to a second subsystem can be achieved even if the synchronization of the second subsystem to the first subsystem is required to be performed first.

Other advantages and features will be apparent from the following description and claims.

BRIEF DESCRIPTION OF THE DRAWINGS

FIG. 4 is a schematic block diagram of a router including the timing and ordering of transfers from the input port to input switch according to the invention.

DETAILED DESCRIPTION

Figure 1:
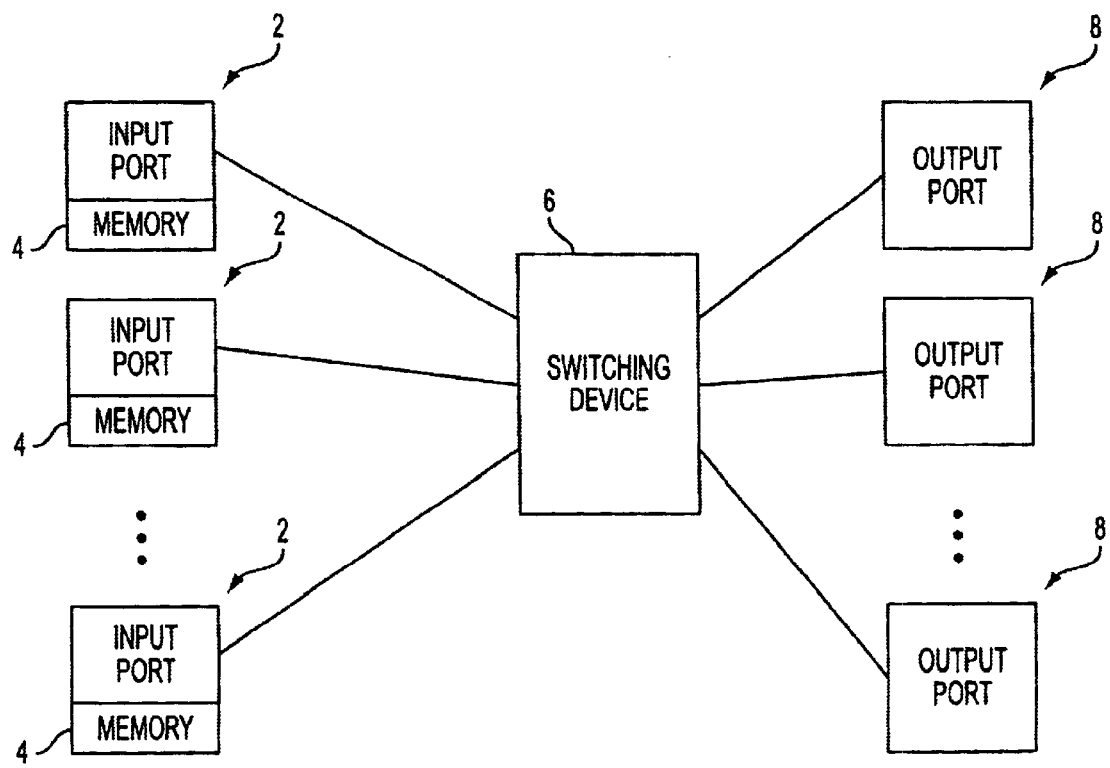
FIG. 1 is a block diagram of conventional router device.
Figure 2A:
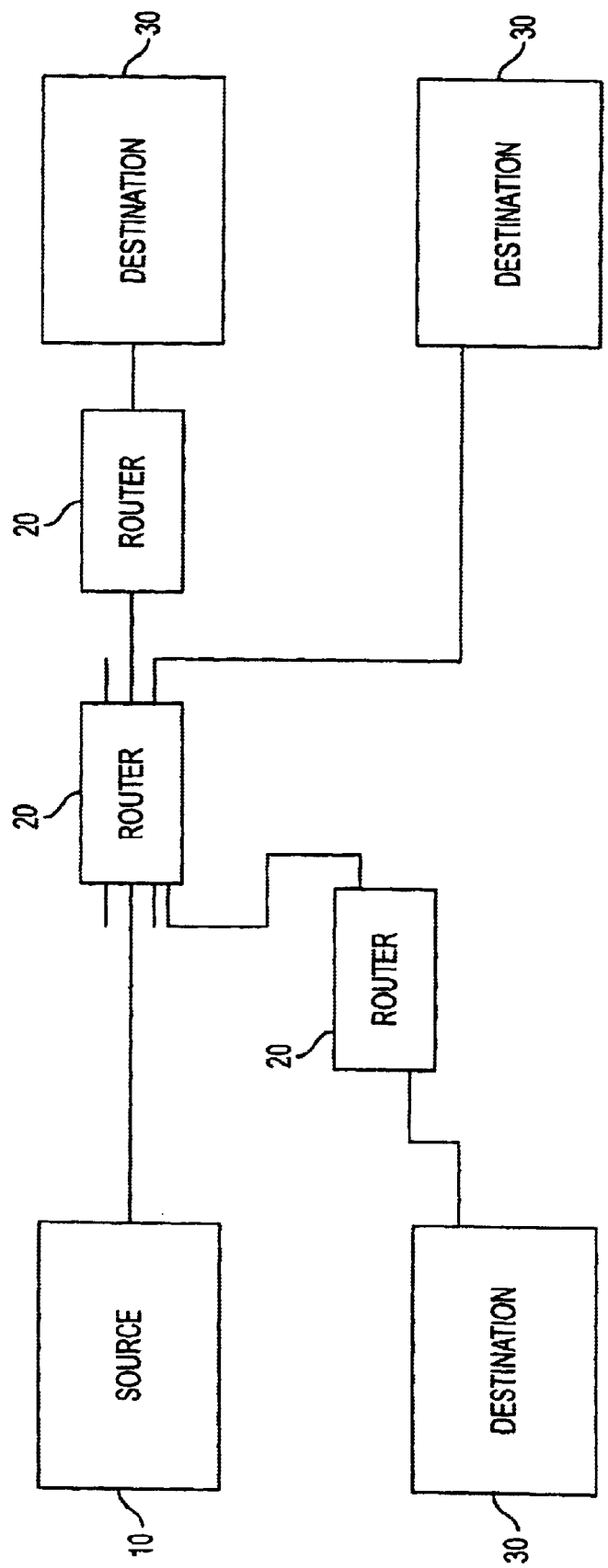
FIG. 2a is a schematic block diagram of a data routing system according to the invention.

Referring to FIG. 2a, in a packet switching system, a source 10 is connected to one or more routers 20 for transmitting packets to one or more destinations 30. Each router includes a plurality of multi-function multiports that are connected to various sources and destinations. A packet from source 10 may pass through more than one router 20 prior to arriving at its destination.

Figure 2B:
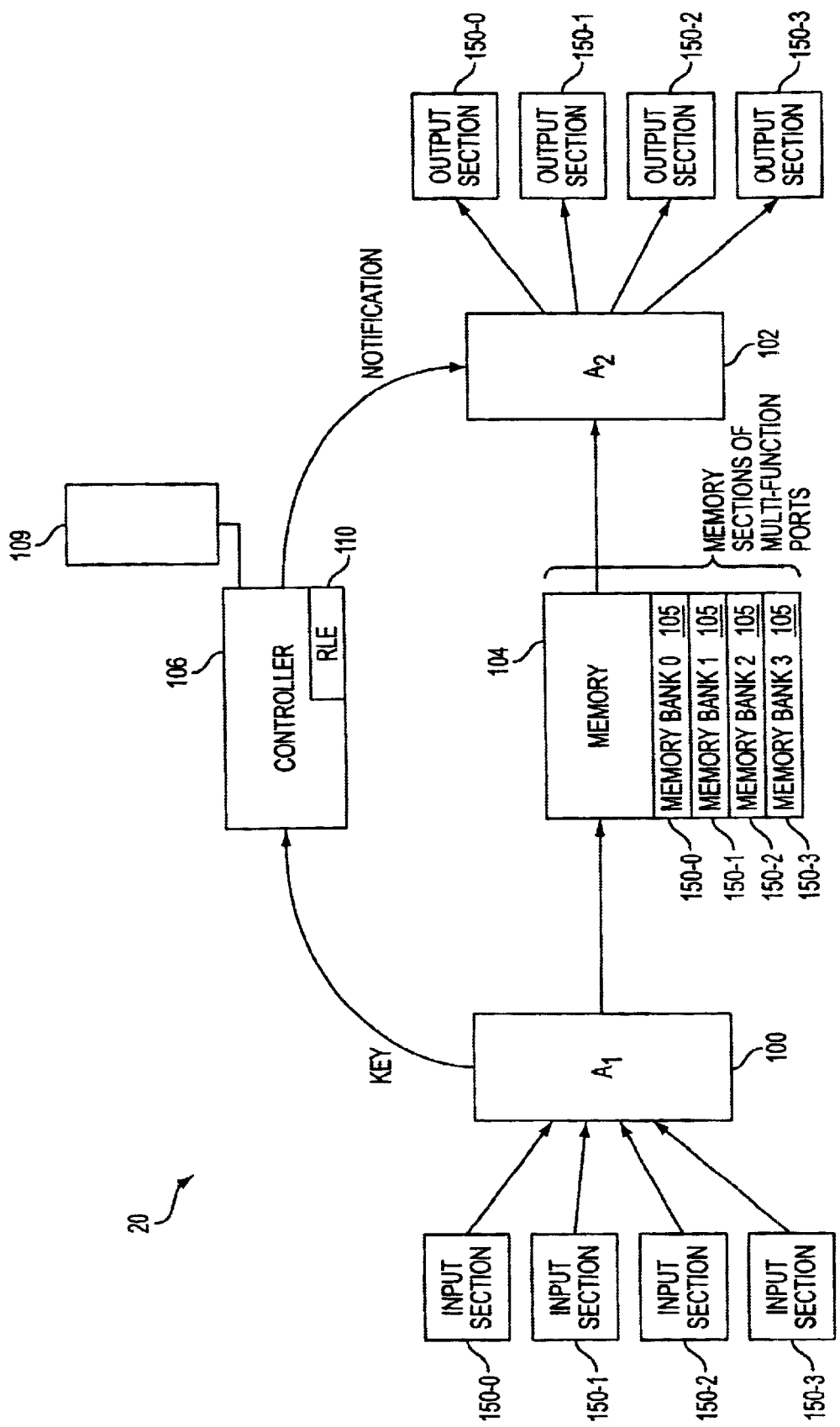
FIG. 2b is a schematic block diagram of a router according to the invention.

Referring to FIG. 2b, each router 20 includes an input switch 100, an output switch 102, a global data buffer 104 including one or more memory banks 105, a controller 106 and a plurality of multi-function multiports 150 (150-0 through 150-3, respectively). Associated with the controller 106 is controller memory 109 for storing a routing table. Input switch 100 and output switch 102 are connected to each multi-function multiport 150 in router 20. In one embodiment, router 20 includes plug-and-play multi-function multiports which allows for easy expansion capability. The present invention will be described with reference to a system including sixteen multi-function multiports 150 (even though FIG. 2b only shows four, with each multi-function multiport including up to sixteen input ports and sixteen output ports. Other configurations may be used depending on user load conditions. Each multi-function multiport includes one or more input ports, one or more output ports and a memory. The configuration and operation of the multi-function multiports will be described in greater detail below.

In operation, packets are received at a multi-function multiport 150, transferred to input switch 100 and stored temporarily in global data buffer 104. When the packet is received by switch 100, a key is read from the first data block in the packet and transferred to controller 106. The key contains destination information which is derived from the header field associated with the first block of data in a packet and other information (such as source ID, priority data and flow ID).

A route look-up engine 110 in controller 106 performs a tree based search based on the key information and returns a result which includes the output multiport associated with the destination. The result is coupled with other information (such as source ID, flow ID and packet length) for routing the packet through router 20 and provided as a notification from controller 106 to output switch 102. Output switch 102 transfers the notification to the identified multi-function multiport 150. Upon receiving the notification information, the multi-function multiport 150 initiates the transfer of the packet from global data buffer 104 through output switch 102 to the appropriate multi-function multiport 150.

Multi-function Multiports

Figure 3A:
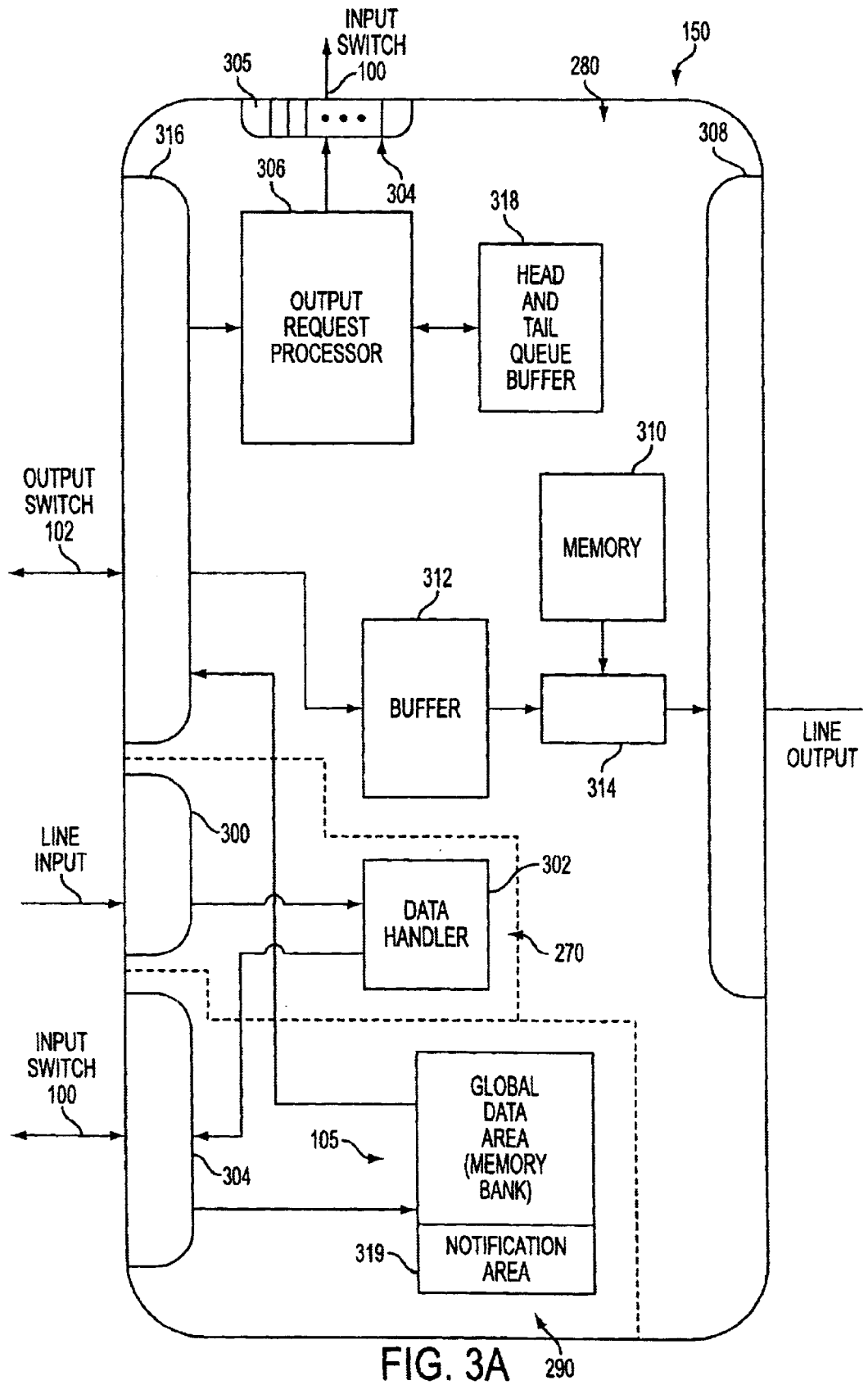
FIG. 3a is a schematic block diagram of an multi-function port according to the invention.

Referring to FIG. 3a, each multi-function multiport 150 includes an input section 270, an output section 280 and a memory section 290.

Input section 270 includes a line input interface 300, a data handler 302 and an input switch interface 304.

Output section 280 includes an output request processor 306, a line output interface 308, a storage device 310, stream output buffers 312 (one for each output stream), output formatter 314, an output switch interface 316 and head and tail queue buffer 318. In addition, the output section includes a portion of input switch interface 304. Specifically, input switch interface 304 includes read request queues 305, one for each memory bank. The use and operation of the read request queues, stream output buffers, and head and tail queue is discussed in greater detail in commonly owned co-pending patent application entitled "HIGH SPEED SWITCHING DEVICE", filed Apr. 18, 1997, assigned Ser. No. 08/844,171, which is hereby expressly incorporated herein by reference.

Memory section 290 includes a memory bank 105 (which represents a portion of the global data buffer 104) and a notification queue body 319.

Figure 3B:
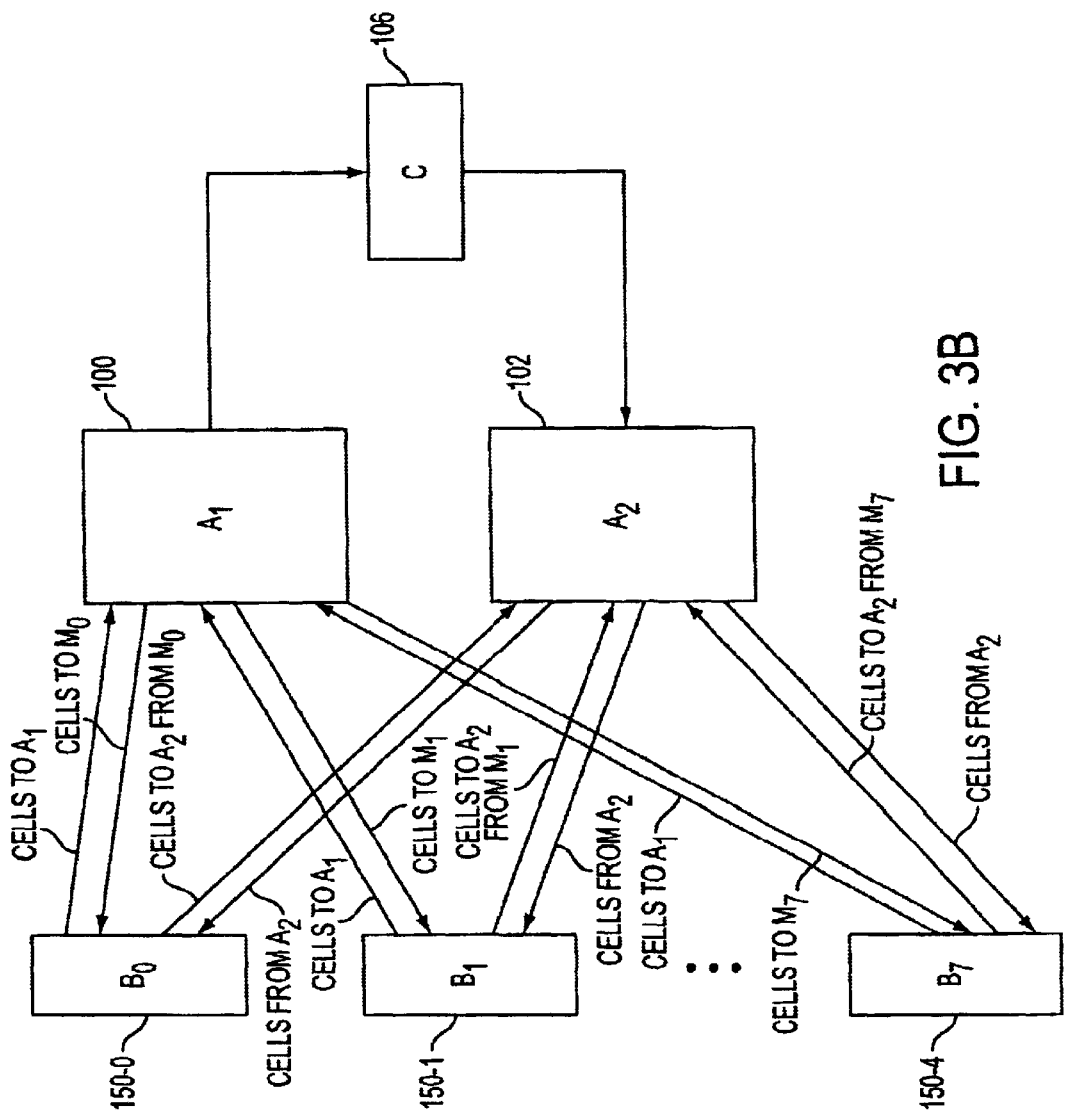
FIG. 3b is a schematic block diagram indicating data transfers between components of the router of FIG. 2b according to the invention.

The multi-function multiport is used in conjunction with the input switch, output switch and controller as is shown in FIG. 3b. The various piece components of the input section, output section and memory section will be described in greater detail below., The combination of the devices into a single unit simplifies the interfaces between the components.

Referring again to FIG. 3a, packets are received at line input interface 300. As the packets are received, data handler 302 divides the packets received into fixed lengths cells. In one embodiment, the length of each cell is 80 bytes, with 16 bytes of internal header (control information) and 64 bytes of cell data. As the data handler divides the incoming packets into fixed length cells, it synchronously outputs the cells to input switch 100 through input switch interface 304.

Figure 3C:
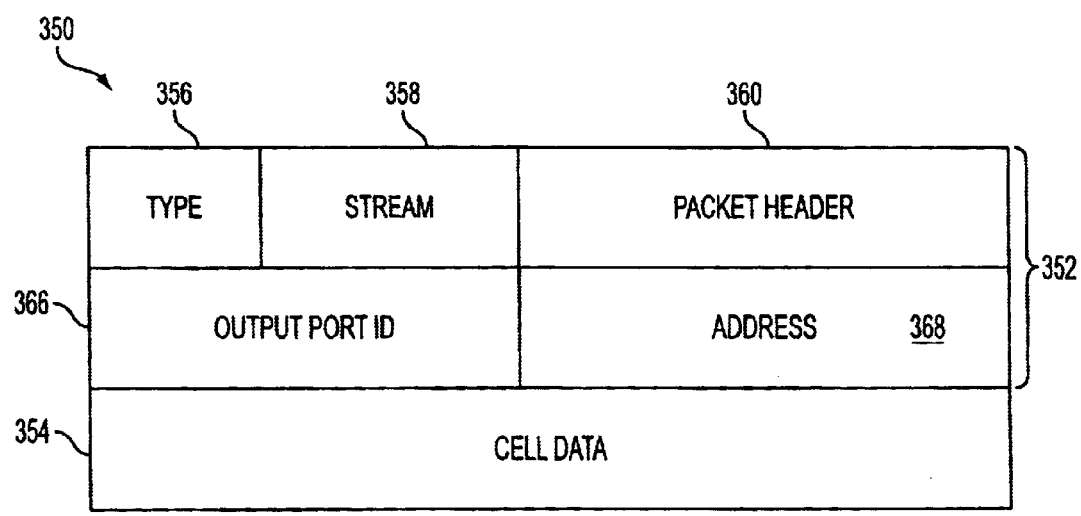
FIG. 3c is a data structure for a cell transferred between a multi-function port and an input switch according to the invention.

The format for transfers between the multi-function multiport and the input switch is shown in FIG. 3c. A cell 350 transferred from a multi-function multiport 150 to the input switch contains a cell header 352 and cell data 354. Cell header 352 includes a type field 356, stream field 358, and packet header fields 360. In addition, cell header 352 includes an independent read request in the form of a multi-function multiport identifier 366 and address 368.

The type field 356 indicates the type of cell to be transferred from the multi-function multiport. At each cell slot (20 clock cycles in one embodiment), a multi-function multiport may transfer either a data cell, an indirect cell placeholder, or a delayed indirect cell placeholder. The generation and operation of indirect placeholder and delayed indirect placeholder is discussed in greater detail in commonly owned co-pending patent application entitled "HIGH SPEED SWITCHING DEVICE", filed Apr. 18, 1997, assigned Ser. No. 08/844,171.

Stream field 358 indicates the stream to which the cell data belongs. Each multi-function multiport can process up to sixteen separate streams of data at a time, one on each of its respective 16 input ports.

Packet header field 360 contains header information associated with a given packet and includes start offset information, packet length and interface index information.

Multi-function multiport identifier 366 identifies the multi-function multiport which is sourcing the read request. Address 368 indicates the address in global data buffer 104 to be read.

Referring now to FIG. 4, a single cell 450 is transferred from a multi-function multiport 150 to input switch 100 at each cell (time) slot "T". For a given cell slot "T", input switch 100 receives a total of "N" cells, where "N" is equal to the number of multi-function multiports.

Input Switch

Figure 5A:
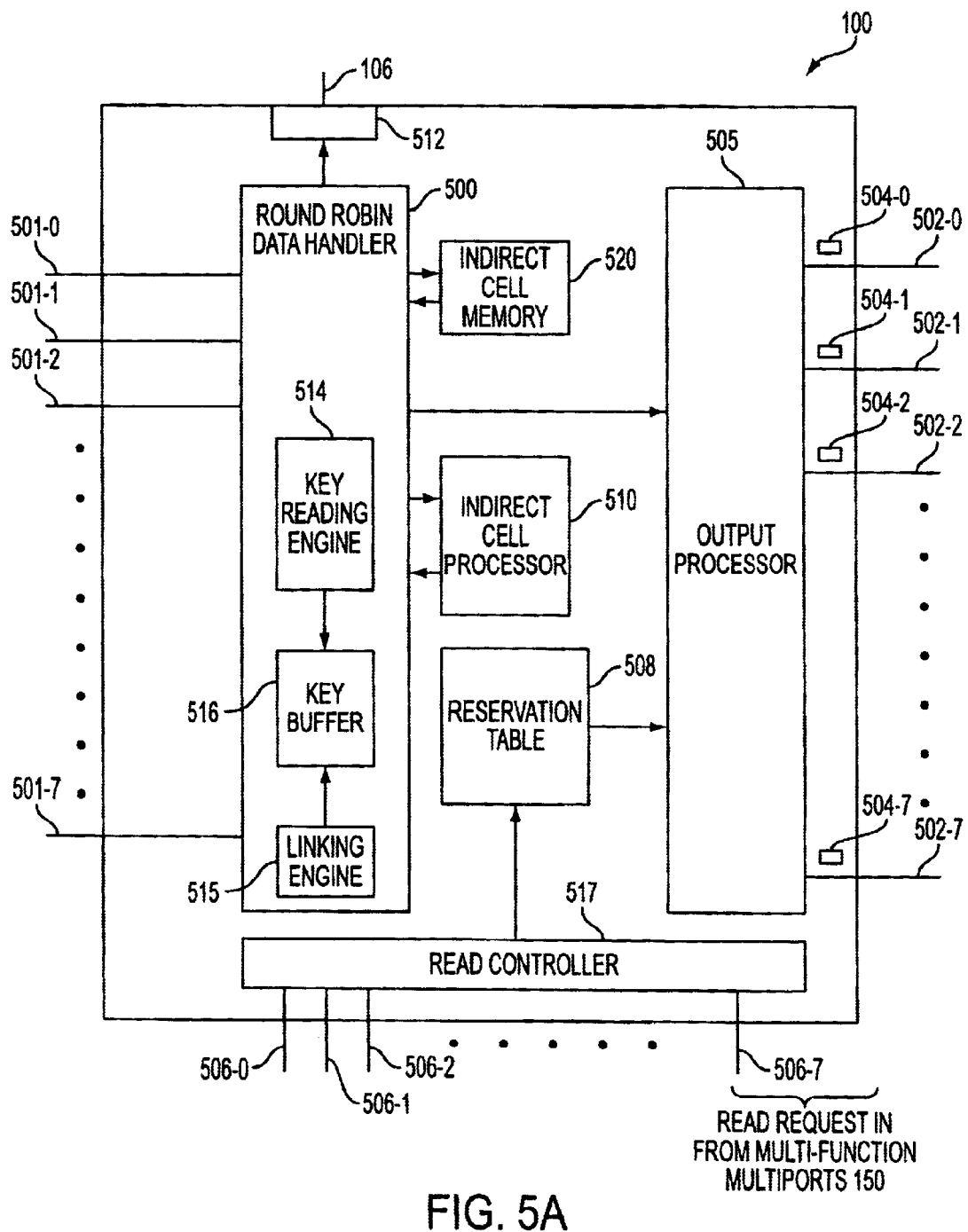
FIG. 5a is a schematic block diagram of an input switch.

Referring to FIGS. 2b and 5a, input switch 100 includes a round robin data handler 500, one or more input interfaces (501-0 through 501-7, one for each multi-function multiport 150), one or more memory interfaces 502 (502-0 through 502-7, one associated with each memory bank), a like plurality of pointers 504 (504-0 through 504-7), an output processor 505, one or more output interfaces 506 (506-0 through 506-7, one for each multi-function multiport 150), a reservation table 508, an indirect cell processor 510, controller interface 512 and read controller 517.

a) Transfers from the Multi-function Multiports

Referring to FIGS. 4 and 5a, the transfer of cells from multi-function multiports 150 to input switch .100 present problems associated with synchronization and metastability. Specifically, round robin data handler 500 within the input switch 100 can process a cell from each multi-function multiport at each clock cycle as described above. However, the multi-function multiports 150 and input switch 100 are isochronous with respect to each other. That is, while the frequency of the common clock signal used by both the multi-function multiports and the input switch is the same (both use the same externally generated clock signal), the phase of the clock with respect to the individual multi-function multiports and the input switch is not the same. Accordingly, while source synchronous communication links may be used between the devices, cells may arrive at arbitrary times at the round robin data handler requiring extra buffering at the input switch to avoid data loss. In one implementation, synchronization of data transfers between the multiple multi-function multiports and the input switch is achieved in a two step process: first a synchronization routine is performed at start-up; and, in a second step, read cycles in the input switch are initiated at a fixed time after a first cell has been detected from any active link. The two step synchronization method is described in greater detail below.

An initialization routine is required to generally synchronize the outputs of the various multi-function multiports. After initialization, each of the multi-function multiports operates at the same frequency, that is, each may write one cell to input switch 100 in one data cycle. However the phase of the streams received from the multi-function multiports varies among the ports. More specifically, the arrival of each cell head (the first bit of a cell) at the input switch will vary for each multi-function multiport 150. The maximum time difference of arrival for two cell heads at the input switch (that is two cell heads associated with two cells to be read in the same data cycle by round robin data handler 500) is defined as time $t_A$ Input switch 100 includes a buffering circuit that synchronizes the reading of data from each multi-function multiport. The read operation is performed at a predetermined time $t_{band}$ after the first arrival of a cell head from any enabled multi-function multiport in a given data cycle. When $t_{band}$ is sized to be greater than $t_A$, a sufficient delay is established to assure that the head of each cell transferred from an enabled multi-function multiport 150 during the data cycle has in fact arrived at input switch 100. Input switch 100 includes a buffer sized to hold a small portion of each cell, up to 8 bits per line in one implementation, and an engine that delays the reading of data from each multi-function multiport a set time until all of the cell heads transferred from the various different multifunction multiports have been received.

Figure 5B:
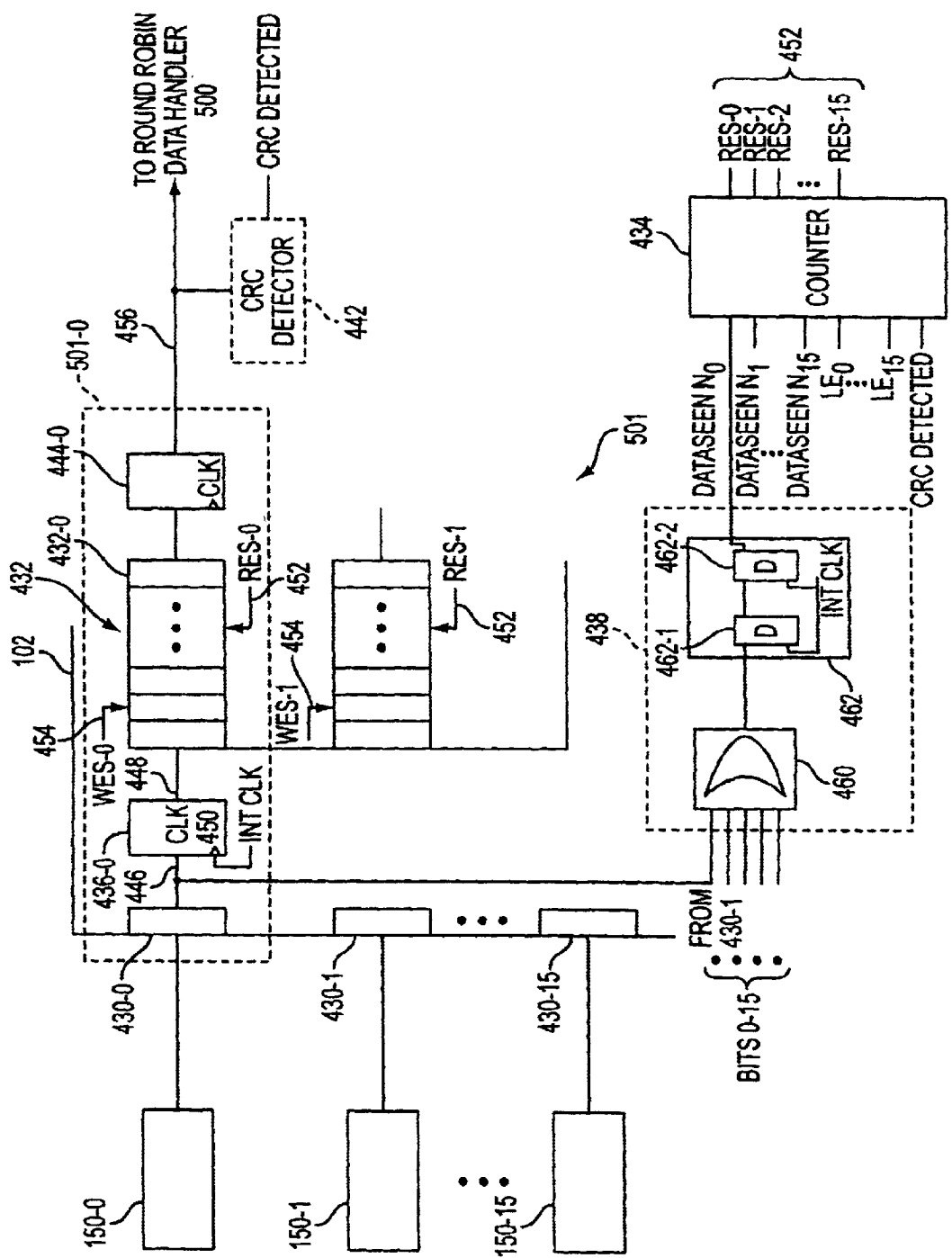
FIG. 5b is a schematic block diagram of an input interface for the input switch.

Referring now to FIG. 5b, each input interface 501 includes an input port 430 for receiving cells from each of the individual multi-function multiports 150, a buffer 432, a counter 434, an input gate 436, clock circuit 438, an output gate 444 and detector 442.

In one implementation, input gate 436 and output gate 444 are D-type flip flops having a data input 446, data output 448 and clock input 450. Data input 446 of input gate 436 is coupled to input port 430. Data output 448 is coupled to buffer 432. Clock input 450 is coupled to an internal clock source (not shown). At each clock cycle (internal clock cycle, i.e., in the input interface domain), a single data bit is transferred from input gate 436 to buffer 432.

Buffer 432 may be of the form of a random access memory (RAM) or circular buffer. Buffer 432 may be dedicated to receive data from a single multi-function multiport or may be sized to support a plurality of multiports. In one implementation, buffer 432 is a 16×16×8 bit RAM (16 buffers that are 16 bits wide and 8 bits deep coupled to 16 data links for receiving data from 16 different multi-function multiports) for storing up to 8 data cycles of data (cell data) from each of 16 input multifunction multiports. Associated with each buffer 432 are a read pointer 452 and a write pointer 454 for each link. Read pointer 452 indicates the next location in buffer 432 to be read from in transferring data to output gate 444 for a given link. Read pointer 432 is incremented upon receipt of a read enable signal (RES) generated by counter 434. The operation of counter 434 is discussed in greater detail below. Write pointer 454 indicates the next location in buffer 432 to be written to when data is transferred from input gate 436. Write pointer 454 is incremented upon receipt of a write enable signal (WES) from clock circuit 438. The operation of clock circuit 438 is discussed in greater detail below.

Data is transferred out of buffer 432 to output gate 444. Data input 446 of output gate 444 is coupled to buffer 432: Data output 448 of output gate 444 is coupled to data bus 456. Clock input 450 is coupled to an internal clock source (not shown). At each clock cycle (internal clock cycle), a single data bit is transferred out on data bus 456. Data bus 456 is coupled to round-robin data handler 500 (FIG. 5*a*) and can be coupled to detector 442. The operation of the detector 442 is described in greater detail below.

Clock circuit 438 includes screening gate 460 and may include one or more synchronization gates 462. Screening gate 460 may be of the form of an OR gate having a plurality of input ports and an output port. The input ports of screening gate 460 are coupled to input interface 501 (one input port is coupled to each data path in a link) and receive data (the same data provided to each input gate 436) from a multi-function multiport 150. The output of screening gate 460 is coupled to the input of first synchronization gate 462-1. In one implementation, two synchronization gates 462-1 and 462-2 are provided. The synchronization gates may be of the form of D-style flip flops which are daisy chained. Each includes a clock input which is coupled to an internal clock source. The output (DATASEEN) of synchronization gate 462 is coupled as an input to counter 434.

Counter 434 receives the plurality of data signals (DATASEEN) generated from each synchronization gate 462 and provides as an output read enable signals (RES-x) to each link. The RES is used to increment the read pointers associated with each buffer 432 that supports an active link. The DATASEEN signal is active when the first bit of data is received from an enabled multi-function multiport. In one implementation, sixteen (16) separate RES signals(RES-0 through RES-15) are generated by counter 434 so as to enable each respective read pointer associated with a given multi-function multiport data link. The RES output of counter 434 is activated a delay time $t_{delay}$ after the receipt of the first bit from an enabled multi-function multiport signaling that data may begun to be read from each buffer 432. The amount of time delay may be adjusted by counter 434. The time delay is measured from the receipt of the DATASEEN signal. In one implementation, the time delay $t_{delay}$ is calculated as the sum of $t_{band}$ plus time $t_{error}$, where $t_{error}$ is an additional error component added to assure no overflow condition arises. The time delay $t_{delay}$ is determinate in sizing buffer 432. Buffer 432 must be sized to store data from the first cell that arrives in a data cycle up to the point in time when the read enable signal is generated by counter 434. In one implementation, the time delay $t_{delay}$ requires six (bits) to be stored. That is, the phase difference between the outputs of the respective multi-function multiports is no greater than 6 bits. In one implementation the number of bits stored in buffer 432 (width of the buffer) is eight (8) bits, even though the time delay $t_{delay}$ only requires six (6) bits of storage. Buffer 432 may be oversized to accommodate the ready commercial availability of such components.

In addition, counter 434 receives as inputs a plurality of link enable signals (one for each multi-function multi-port supported by input switch 100). The link enable signals can be generated in software. The link enable signals indicate the active links (multi-function multiports) that are transferring cells to the input switch. Counter 434 generates a RES signal for each active link, enabling the transfer of data from each buffer 432 to a respective data bus 456. The link enable signals are used to inhibit counter 434 from responding to spurious or otherwise erroneous signals generated by gate 460. In the event that a link becomes stuck (the output of gate 460 is stuck in one position), that link may be disabled, the machine reset and the "data" from the link associated with the stuck gate may be disregarded.

Synchronization

1. Initialization

Figure 5C:
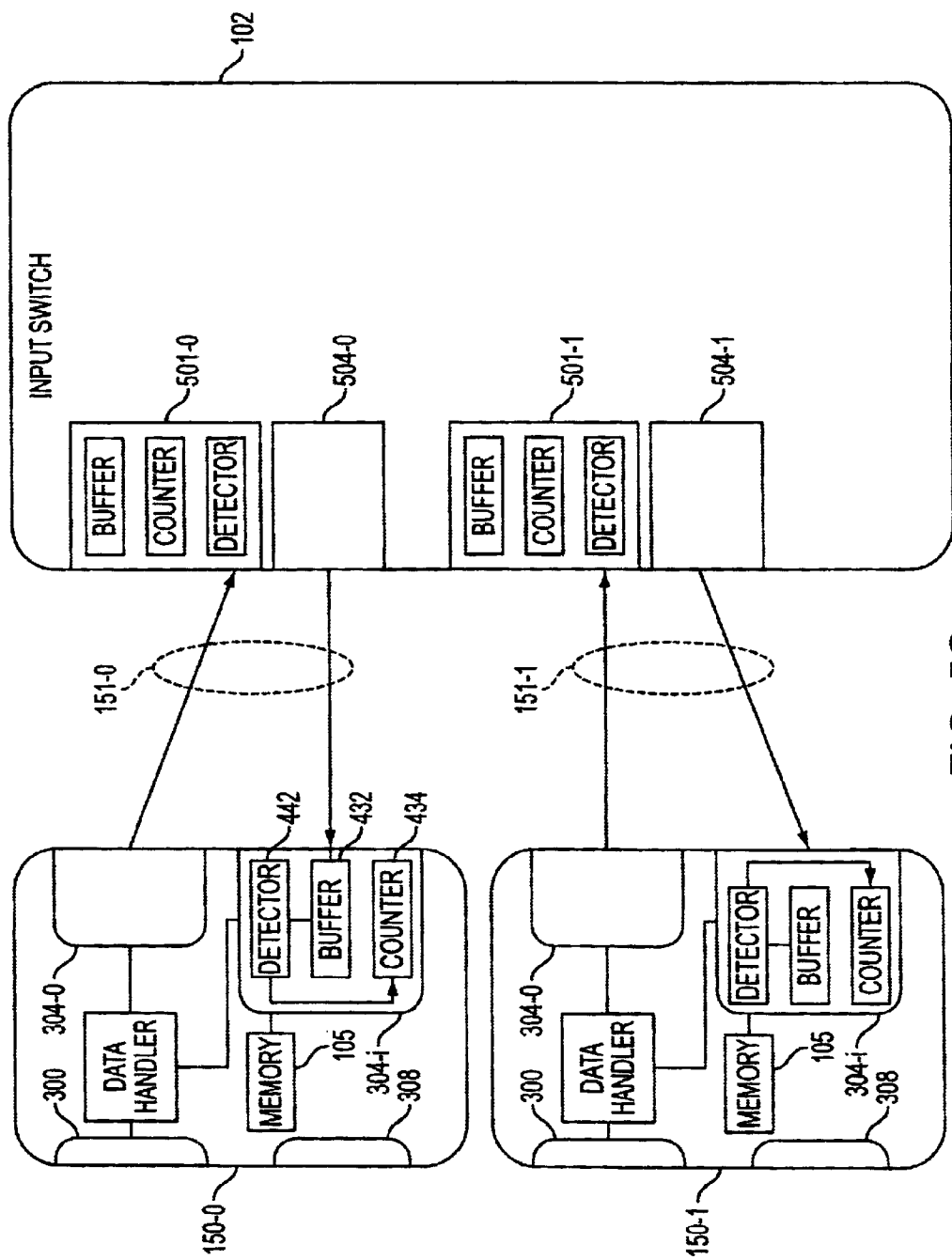
FIG. 5c is a schematic block diagram showing the data links between the input switch and a multi-function multiport.

FIG. 5*c* shows two multi-function multiports and their respective interfaces for communicating with input switch 100. At start up, the individual multi-function multiports must be generally synchronized in order to assure that cells generated from each of the individual multi-function multiports will arrive within a single $t_{band}$ time period. To synchronize the multiple multi-function multiports, the two way communication link between the multi-function multiports 150 and input switch 100 is exploited.

As described in detail below, communication links coupled between input switch 100 and each multi-function multiport are used to transfer data to the input switch and receive data for storage in a memory bank 105 in the respective multi-function multiport. A portion of the data bandwidth used to transfer packets from the input switch to the multi-function multiport can be dedicated for the transfer of synchronization information required to synchronize the multi-function multiports. Alternatively, the normal data paths may be used and a special synchronization (or acknowledgment) signal may be transferred on the data path.

Input interface 304 of each multi-function multiport is divided into an input section 304-i and: an output section 304-o. Input section 304-i is configured to receive data from input switch 100 and output section 304-o is configured to transmit cells received from data handler 302 to input switch 100. Each input section 304-i can be configured to include an interface circuit similar to input interface 501 as shown in FIG. 5*b*.

Accordingly, input section 304-i in each multifunction multiport receives data from input switch 100 and includes a buffer 432 (similar to buffer 432 in FIG. 5*b*) for receiving data, various input and synchronization gates (not shown), a counter 434 and a detector 442. In one implementation, the link from input switch 100 to a multi-function multiport includes two or more data paths which must be synchronized. The synchronization of the data paths is similar to the synchronization of the links coupled to the input interface 501 of input switch 100. Synchronization of plural data paths in a link is discussed in further detail below.

At initialization, input switch 100 produces a initialization signal which is transferred through links 151 (151-0 and 151-1 of FIG. 5*c*) to the respective input sections 304-i of each multi-function multiport 150.

Detector 442 in the multi-function multiport input switch interface (input section 304-i) is used to detect the synchronization signal. Detector 442 in the multi-function multiport interface can be a CRC detector configured with a predefined algorithm for generating a synch detected signal upon detecting a particular sequence of input bits. In one implementation, the synchronization signal is a predefined number bits having a one ("1") value which are transferred during the write cycle used to transfer cells from input switch 100 to the respective multi-function multiports 150 in support of writing data to the global memory buffer. In one implementation, at least two consecutive 1's are transferred to initialize the link.

Data handler 302 receives data from the respective streams and divides the incoming packets into cells for transfer to input switch 100 as described above. At initialization, data handler 302 provides no data output. When the synchronization signal is detected, data handler 302 outputs an acknowledgment signal to input switch 100 indicating that the synchronization signal has been detected. Data in the multi-function multiport is held until the termination of the synchronization signal (as determined by detector 442) as described below.

The acknowledgment signal can be an all zero's data stream transferred from a respective multi-function multiport to the input switch. The acknowledgment signals are received at clock circuit 438 and input gate 436 of input interface 501-0 and 501-1. Each acknowledgment signal is transferred into buffer 432. The acknowledgment signal is passed out of buffer 432 through output gate 440 onto data bus 456 and is detected by detector 442 in the input switch interface.

Detectors 442 at the input switch 100 detect the acknowledgment signal and provide an output signal which is used in terminating the synchronization signal. After all the of the links between the multi-function multiports and the input switch have returned the acknowledgment signal, the synchronization signal from input switch 100 to the multi-function multiports is terminated.

Detectors 442 in a respective input section interface detect the termination of the synchronization signal and initiate the transfer of data cells thereafter.

2. Synchronizing Plural Data Links (paths)

The plural links that carry the acknowledgement signals from a respective multi-function multiport are synchronized as follows. The combination of input and output gates 436 and 444 and buffer 432 of input interface 501 form a synchronous storage element (synchronous RAM) adeptly suited for processing phase difference data. Initially, both the read pointer and the write pointer associated with a given buffer 432 are set to the same location. When data for a first acknowledgment signal is received, the write pointer of buffer 432 is incremented on each data cycle as data is received. As the write pointer is incremented, buffer 432 is loaded with data. The receipt of data on a link triggers the generation of a DATASEEN signal which is provided as an input to counter 434. After the appropriate time delay, the read pointer for each active link is incremented indicating that the time period for receipt of a cell header for a given data cycle has closed and that data may begin to be read by round robin data handler 500. Round robin data handler reads data provided on data bus 456. After the read pointer is enabled, the read pointer is incremented at the same rate as the write pointer, avoiding any data overflow condition in buffer 432. The DATASEEN signal and counter is only active during the first data cycle. Thereafter, the read and write pointers are continuously incremented in support of data cells received from the respective multi-function multiports.

Synchronization between multi-function multiports and the input switch has been described above. Other portions of the router may require application of similar synchronization techniques. For example, the link between the multi-function multiports and the output switch is similarly configured. In order to assure that a cell is received at the output switch from each multi-function multiport in a given clock cycle, synchronization of the link is required. Again, each of the interfaces that receive plural data path connections is configured with a buffer, logic gates, and a detector for allowing the synchronization of the plural data paths.

In one implementation, the link between input switch 100 and each multi-function multiport includes a plurality of data paths for transferring data. Data paths can be synchronized as described above by incorporating the input interface circuit described in association with FIG. 5b into the receive portion of each path.

The transfer of data on other links between the subsystems of the router is described in greater detail below.

b) Transfers through the Input Switch

Referring again to FIG. 5a, round robin data handler 500 receives cells from each multi-function multiport and transfers them to output processor 505 for output to an appropriate memory bank 105 in global data area 105 (FIG. 3a). Round robin data handler 500 services the inputs (cells) received on input interfaces 501 via data bus 456 in a round robin, time division multiplexed manner. That is, for a given cell slot, one cell from each multi-function multiport is received at the round robin data handler 500 and subsequently transferred to output processor 505 for transfer at the next cell slot to a memory bank 105 in global data buffer 104. At the next time cell slot, data handler 500 transfers the next cell received from the same multi-function multiport to output processor 505 for transfer to a different memory bank. In one embodiment, the next cell received is transferred to the next memory bank (next in numerical order, modulo N) in the memory array. Alternatively, another time dependent permutation may be used to control the transfer of successive cells from the same multi-function multiport.

Figure 5D:
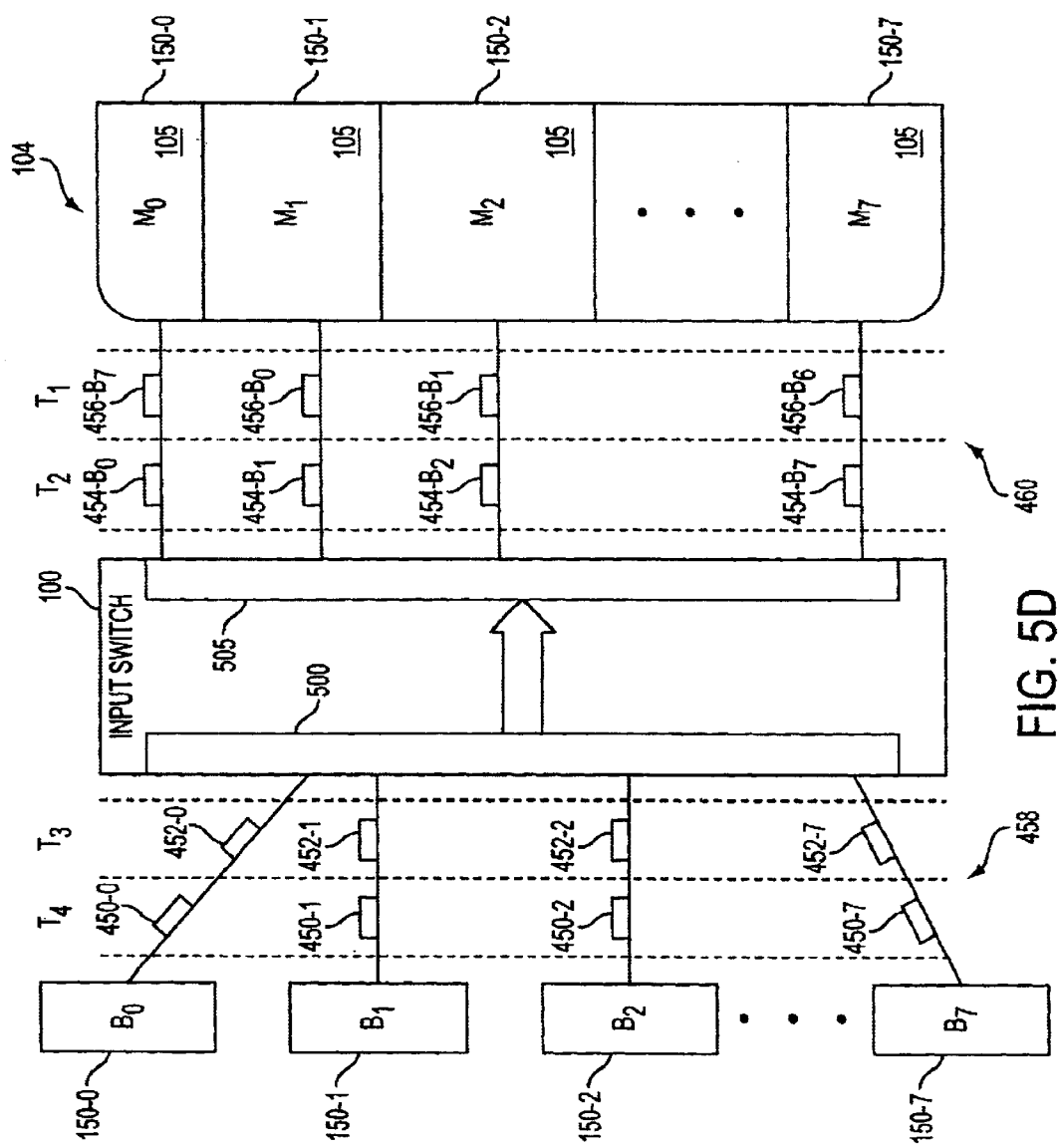
FIG. 5d is a schematic block diagram of a router including the timing and ordering of transfers from the input port.

Referring to FIG. 5d, the timing and ordering of transfers from the multi-function multiport to memory is shown. For the purposes of this example, a sequence of cells is depicted on each transmission line. For the purposes of this example only, each transmission line is considered to be very long and contains data associated with two or more cells. In operation, the transmission lines are short and multiple cells are not present on a transmission line at a given time. At cell slot T4 a series of cells 450-0 through 450-7 are transferred down transmission lines 458, one from each multi-function multiport 150 to input switch 100. At cell slot T3 (one just prior in time to cell slot T4) a series of cells 452-0 through 452-7 are transferred down transmission lines 458, one from each multi-function multiport 150 to input switch 100.

Round robin data handler 500 and output processor 505 within the input switch 100 transfer cells out to global data buffer 104 on transmission lines 460. As can be seen at cell slot T2, output processor 505 outputs one cell 454-$B_0$ to 454-$B_7$ to each memory bank in a single cell slot. The "$B_x$" designator indicates the multi-function multiport from which the particular cell was received. One cell from each multifunction multiport is written to global data buffer 104 per cell slot. At time period T1 (one cell slot prior to cell slot T2), again one cell (456-$B_o$ to 456-$B_7$) is written to each memory bank. Round robin data handler 500 time division multiplexes the transfers to output processor 505 such that consecutive cells from the same multi-function multiport are written to consecutive memory banks 105 (modulo N) in global data buffer 104.

Referring again to FIG. 5a, pointer 504 indicates the location in an associated memory bank to which the next cell will be written. Output processor 505 writes a cell to a memory location in a particular memory bank based on the next available address in the bank as is indicated by the associated pointer 504.

c) Key Reading and the Linking Process

Round robin data handler 500 includes a key reading engine 514 for determining the key information associated with a first cell in a packet and a linking engine 515 for linking cells in the same packet. The linking of cells through output switch 102 is described in greater detail in commonly owned co-pending patent application entitled "HIGH SPEED SWITCHING DEVICE", filed Apr. 18, 1997, assigned Ser. No. 08/844,171.

d) Transfers to Memory

Figure 6:
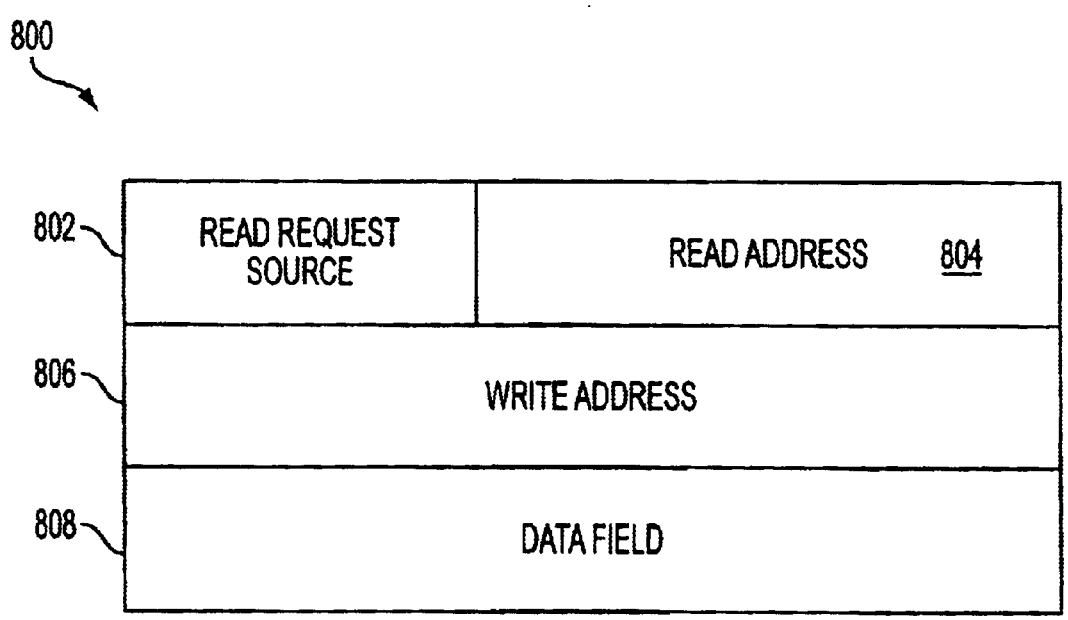
FIG. 6 is a data structure for a cell transferred between the input switch and a memory bank according to the invention.

The data structure of a cell transferred from input switch 100 (via the output processor 505) to a memory bank 105 in global data buffer 104 is shown in FIG. 6. The unit of addressing and memory allocation is a 64-byte cell, and all accesses to memory are either cell reads or cell writes. A cell size of 64 bytes was chosen as a compromise between the conflicting requirements of bandwidth efficiency and storage efficiency. DRAM bandwidth efficiency dictates larger sizes, while storage loss caused by internal fragmentation when fitting variable size packets into fixed size cells dictates smaller sizes.

At each cell slot, output processor 505 generates a cell 800 which includes a read request source field 802, read address 804, write address 806 and data field (cell data received from multiport 150) 808. The read request source field 802 indicates the output port (in the particular multi-function multipart 150) requesting the read (destination output port). Output processor 505 receives read requests from read controller 517 and bundles the read request with any write request received from round robin data handler 500 destined for the same memory bank. At each cell slot, output processor 505 provides a cell 800 which may include a write and read request to each memory bank 105 in global data buffer 104.

Read controller 517 controls the transfer of read request signals flowing from input switch 100 out memory interface 502 to the individual memory banks in global data buffer 104. Read controller 517 receives read requests from each multi-function multiport through output interfaces 506. The format of each request includes source identification (output port) and a full address in memory which is to be read. At each cell slot, each multifunction multiport port may generate a read request for processing by switch 100 to read a memory location in global data buffer 104, resulting in the reading of a cell (a read reply) from a memory bank 105 (on a subsequent cell slot) to output switch 102.

Read controller 517 loads a reservation table 508 as requests to transfer packets are received from the various multi-function multiports 150. The architecture and routing of read requests is described in greater detail in co-pending patent application entitled "HIGH SPEED SWITCHING DEVICE", filed Apr. 18, 1997, assigned Ser. No. 08/844, 171.

Memory Architecture

Main memory is used as temporary buffer storage for packets flowing into the system on input streams and out of the system on output streams. Main memory is divided into two distinct parts: a global data buffer that is used to store incoming packets while the lookup engine determines the outgoing stream for each packet; and packet notification queues that are used to store packet pointers (notifications) after the outgoing stream has been determined. Notification queues are associated with outgoing streams, whereas the global data buffer forms a common pool shared amongst all the streams.

The global data buffer includes a plurality of memory banks. Associated with each memory bank is an input switch interface (an input port) 304 and output switch interface (an output port) 316. At each cell slot, each memory bank receives at most one write and one read request via input switch interface 304. The write requests are associated with cells received from a multi-function multiport 150. Read requests reflect a request for cell data to be transferred from a memory bank 105 to output switch 102 for ultimate transfer to a requesting multi-function multiport 150.

The memory in the multi-function multiport configuration is physically distributed across a number of banks b, one bank for each active multi-function multiport in the system.

A) Transfers from the Input Switch to Memory

Referring again to FIG. 5c, the transfer of cells from the input switch 100 to global data buffer 104 is performed in a time division multiplex fashion. That is, consecutive cells from a given multiport are directed to different memory destination locations. At each time period (cell slot), the input switch transfers to memory a single cell received from each multi-function multiport (as available) into memory. At a next time T+1 the input switch transfers again a single cell from each multiport into memory. Successive entries from the same input multiport are written to different memory banks 105 in global data buffer 104.

Controller

Referring again to FIG. 2b, controller 106 includes controller memory 109, route look-up engine 110, an input switch interface, and output switch interface. Controller 106 receives a route look-up request from input switch 100 at the input switch interface. Route look-up and the matching of keys retrieved from a packet in order to determine a best match route through the router is described in greater detail in co-pending patent application entitled "HIGH SPEED VARIABLE LENGTH BEST MATCH LOOK-UP IN A SWITCHING DEVICE", filed on Dec. 16, 1996, by Fergusen et al., Ser. No. 08/767,576, which is hereby expressly incorporated herein by reference.

The route look-up engine servicing the route look-up request performs a best match look-up and outputs a notification through output switch interface to output switch 102. The notification includes a result which indicates the multi-function multiport to be used in the transfer of the packet to its destination.

Output Switch

Figure 7:
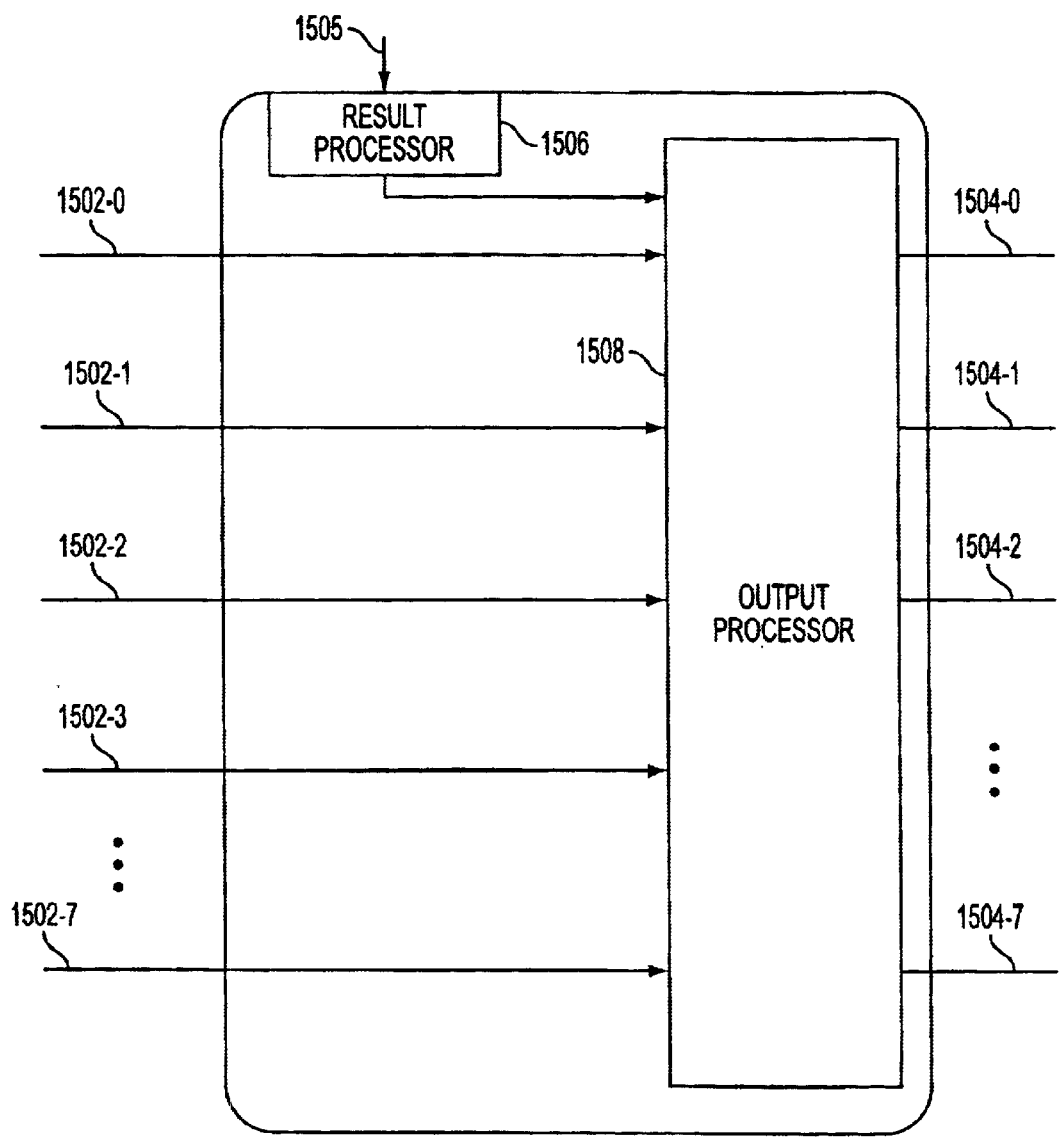
FIG. 7 is a schematic block diagram of an output switch according to the invention.

Referring now to FIG. 7, output switch 102 includes a controller interface 1500, one or more memory inputs 1502 (1502-0 through 1502-7, one for each memory bank), one or more outputs 1504 (1504-0 through 1504-7, one for each multi-function multiport), a result processor 1506 and an output processor 1508. Output switch 102 performs four functions: receive output results, process output results, receive cells from memory and output cells to output ports.

a) Transfers from Memory to the Output Switch

Cells from memory are received at memory inputs 1502 and transferred to output processor 1508. As described above, in order to synchronize the transfer of data from distributed memory devices (multi-function multiports) to the output switch, an interface configured as shown in FIG. 5b may be included in the output switch. Cells are transferred based on read requests received at the input switch from multi-function multiports.

Output processor 1508 decodes the destination multi-function multiport from cell information received from memory and transfers the cell data to the appropriate outputs 1504. At each cell slot, output switch 102 may receive a cell for processing from each bank in global data buffer 104.

b) Transfers from the Output Switch to the Multi-function Multiports

Output switch 102 receives notification from controller 106 on controller interface 1500. Result processor 1506 decodes the result (route) and determines which multi-function multiport(s) 150 is (are) to receive the route data. Based on a mask in the notification, result processor 1506 transfers the notification to output processor 1508 for transfer to each multi-function multiport 150 indicated. At each cell slot, output processor 1508 provides (via outputs 1504) a route to each multi-function multiport 150.

Output Section of a Multi-function Multiport

Figure 8:
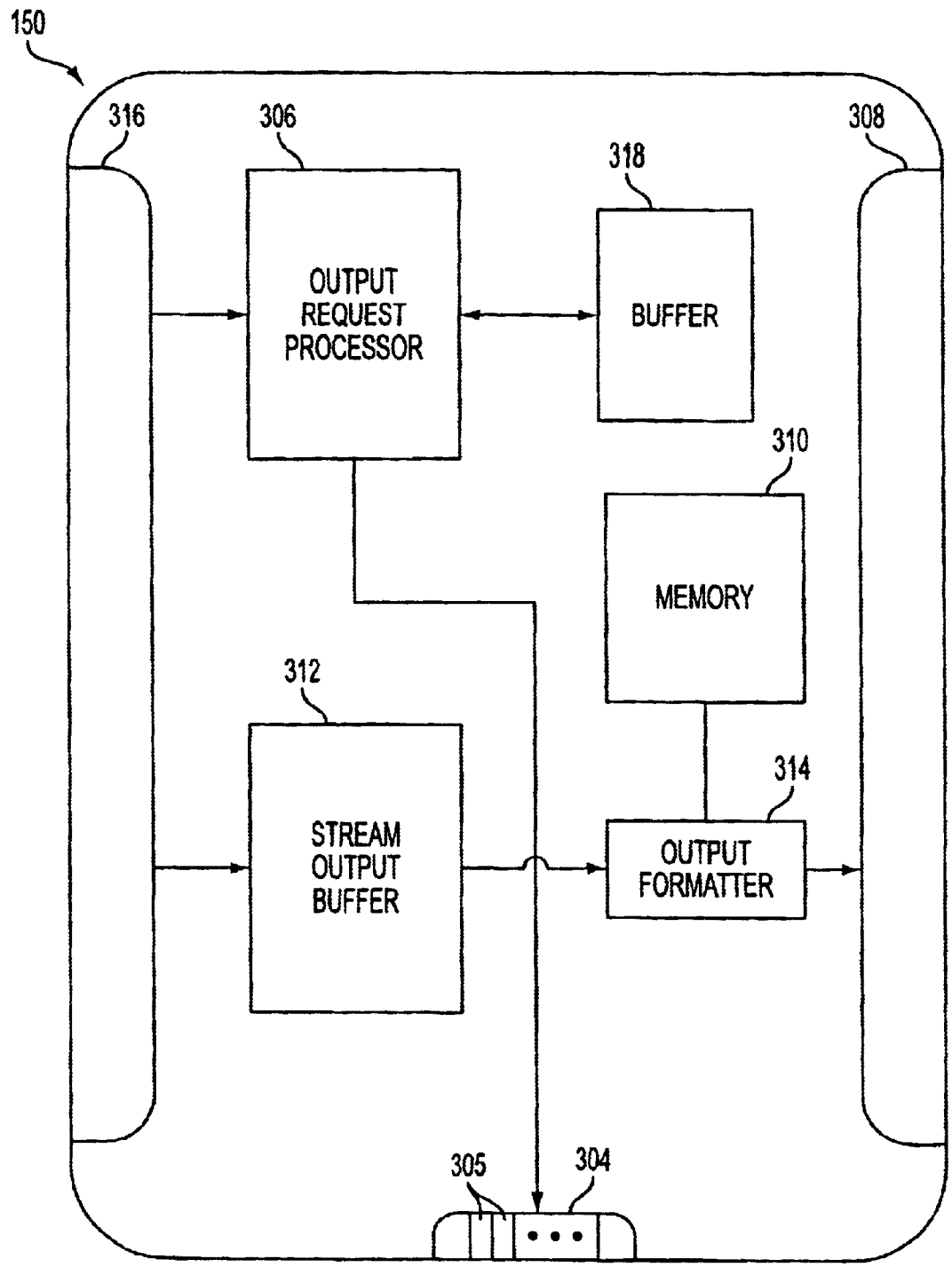
FIG. 8 is a schematic block diagram for an output section of a multi-function port.

Referring now to FIG. 8 each multi-function multiport 150 includes an output switch interface 316, an input switch interface 304 including read request queues 305, head and tail queue buffer 318, an output request processor 306, an line output interface 308, storage device (memory) 310, stream output buffers 312 and output formatter 314.

The architecture the output section of a multi-function multiport and the routing of cells through the output section is described in greater detail in co-pending patent application entitled "HIGH SPEED SWITCHING DEVICE", filed Apr. 18, 1997, assigned Ser. No. 08/844,171.

Packet Routing Overview

Figure 9:
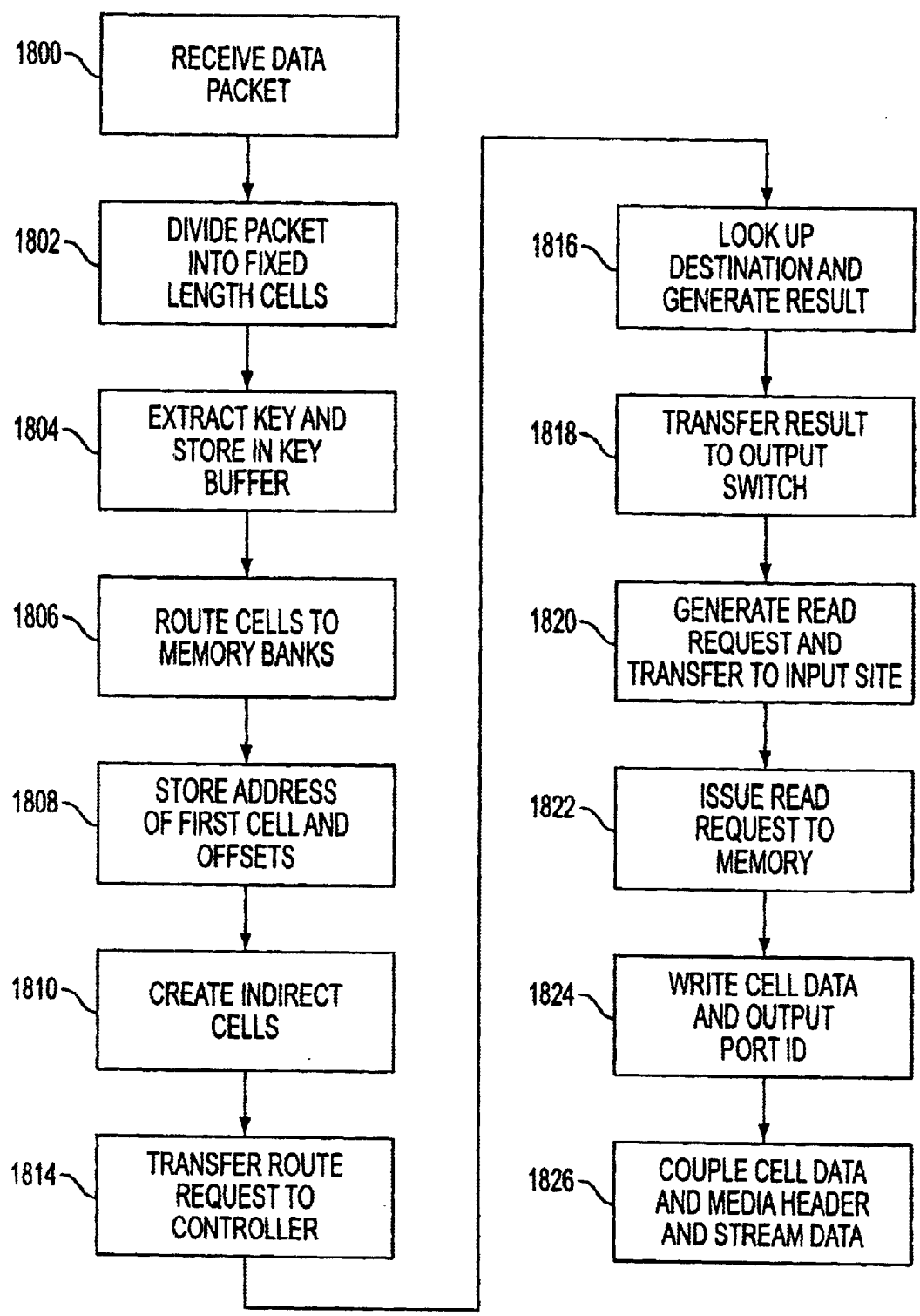
FIG. 9 is a flow diagram for a process of routing a packet through a router according to the invention.

Referring now to FIG. 9, in a method of routing packets through a switch, a packet is received at a multi-function multipart (1800). The multi-function multiport divides the packet into fixed length cells and transfers the cells to an input switch (1802). Input switch removes the key information from the first cell in a packet and stores it temporarily in a key buffer (1804). Thereafter the input switch routes the cells to memory banks resident in the multi-function multiports in a time division multiplexed manner (1806). The input switch stores the first address in memory where the first cell is stored and computes offsets for each additional cell associated with the offset in memory for the next contiguous memory bank into which the next cell is written (1808). The input switch creates indirect cells to store linking information for the packet if the packet length exceeds five cells (1810). If the number of cells exceeds the number of available offsets in an indirect cell, then the old indirect cell is stored in memory and a new indirect cell is created and loaded based on the offsets calculated for each new cell received at the input switch.

When the packet (and its indirect cells if any) have been stored in memory, then the key, full address of the first cell and offset information is transferred as a lookup request to a controller (1814). The controller performs a best match look-up and generates a result of the look-up. The result includes the destination port (multi-function multiport), address, offset information and next hop index (1816). A notification including the result is transferred to the output switch for transfer to the appropriate multi-function multiport (1818).

Upon receipt of a notification, the multi-function multiport generates read requests a cell at a time to the input switch for the data associated with the packet (1820). The input switch issues the read requests in a time division multiplexed fashion generating a single request to each memory bank per cell slot (1822). When the memory bank receives the request from the input switch, cell data and a multi-function multiport identifier associated with the request are transferred to the output switch (1824). Again, at each cell slot, the output switch transfers a single cell to each of the multi-function multiports. Upon receipt, the multi-function multiport couples the cell data with a media header and streams the data to a destination (1826).

Initialization

Synchronization is achieved in the router in two phases. An initialization phase is triggered at power up. The initialization phase is used to synchronize the major components that operate isochronously with respect to each other. In a second phase, components within the router are kept in synchronization after the initialization phase by using a common clock, source synchronous links and interface circuitry as described above.

At initialization, the sequence of synchronization is ordered for the respective links in the router. Referring again to FIG. 2a, in one implementation, the controller 106 to input switch 100 links and controller 106 to output switch 102 links are the first links synchronized. The links coupling input switch 100 to each multi-function multiport 150 are initialized next. The initialization includes generating a synchronization signal for transfer to each of the respective multi-function multiports 150. Thereafter, the links between the multi-function multiports 150 and input switch 100 are initialized including the transfer of acknowledgment signals from each of the active links.

After receipt of all the acknowledgment signals, the links coupling input switch 100 and each multi-function multiport 150 are synchronized. The synchronization signal transmitted by the input switch is terminated. At the same time, the links between input switch 100 and controller 106 are synchronized.

The links between the multi-function multiports 150 and output switch 102 are synchronized next. Thereafter, the respective multi-function multiports 150 are enabled to transmit data resulting in the synchronization of the links between the multi-function multiports 150 and input switch 100. Finally the links between output switch 102 and the multi-function multiports 150 and between output switch 102 and controller 106 are synchronized.

The present invention has been described in terms of specific embodiments, which are illustrative of the invention and not to be construed as limiting. Other embodiments are within the scope of the following claims.

What is claimed is:

1. A synchronization circuit for synchronizing components operating isochronously that are coupled by a plurality of independent links, comprising:

a first and second buffer, each including an input port coupled to an external link of the plurality of independent links, an output port, a read pointer and a write pointer, the read pointer indicating a next location in a respective buffer to be read in transferring data out on the output port, the write pointer indicating a next location in the respective buffer to be written when receiving data on the input port and configured to automatically increment upon receipt of a first data bit on a respective external link;

a trigger circuit coupled to each link of the plurality of independent links for receiving external trigger signals, each external trigger signal included along with data transmitted on a respective link and indicating when data is present on the respective link; and a counter coupled to the trigger circuit, the counter including a trigger input and a predefined delay period, only after receipt of a first of the external trigger signals on the trigger input the counter being operable to output a read enable signal to each of the read pointers after the delay period has expired.

2. The synchronization circuit of claim 1 where data transmitted over a data portion of the link is the trigger signal.

3. A method for synchronizing components operating isochronously that are coupled by independent links comprising:

provviding a synchronization signal from a first component to a plurality of second components through independent first links;

upon detection of the synchronization signal at a respective second component, returning an acknowledgment signal from each of the second components to the first component through one of a like plurality of second links;

when all the acknowledgment signals have been returned, terminating the transmission of the synchronization signal from the first component to the plurality of second components;

upon detecting the termination of the synchronization signal at each second component, initializing data transfer on the second links.

4. The method of claim 3 where first component is a switch in a router and second components are input ports for receiving data from a network.

5. A method of synchronizing a plurality of components, comprising:

transmitting an initialization signal to each of the plurality of components via a corresponding plurality of independent links;

receiving acknowledgment signals from respective ones of the plurality of components; and concurrently terminating transmission of the initialization signals to the plurality of components in response to receiving a last one of the acknowledgement signals.

6. The method of claim 5, wherein the plurality of components comprise circuits for processing data packets.

7. The method of claim 5, further comprising:

after terminating transmission of the initialization signals, receiving packets from one or more of the plurality of components.

8. The method of claim 7, wherein the packets comprise data packets, control packets, or cells.

9. The method of claim 7, further comprising:

for each component from which packets are received, writing the packets in a buffer at a location identified by a write pointer.

10. The method of claim 9, further comprising:

for each component from which packets are received, reading the packets from the buffer at a location identified by a read pointer.

11. The method of claim 10, wherein the reading step is performed a predetermined time after a first packet is written into the buffer.

12. The method of claim 10, further comprising:

outputting the read data packets to a data handler.

13. A circuit for synchronizing a plurality of components, comprising:

first logic configured to transmit an initialization signal to each of the plurality of components;

second logic configured to receive acknowledgement signals from respective ones of the plurality of components;

third logic configured to terminate transmission of the initialization signals to the plurality of components in response to receiving a last one of the acknowledgement signals;

a buffer for storing received packets after transmission of the initialization signals is terminated;

a trigger circuit for generating a trigger signal when a first packet is received; and read logic for reading packets from the buffer a predetermined time after the trigger signal is generated.

14. The circuit of claim 13, wherein the predetermined time is greater than a maximum time difference of arrival for two packets.

15. A circuit for synchronizing the transfer of packets from a plurality of components, comprising:

a memory for storing packets transferred from the plurality of components;

a trigger circuit for generating a trigger signal only when a first packet of the packets from the plurality of components is received; and read logic for reading packets from the memory a predetermined time after the trigger signal is generated.

16. The circuit of claim 15, wherein the predetermined time is greater than a maximum time difference of arrival for two packets.

17. The circuit of claim 15, wherein the read logic comprises a counter for updating a read pointer in the memory a predetermined time after the trigger signal is generated.

18. The circuit of claim 15, wherein the packets comprise data packets, control packets, or cells.

19. The circuit of claim 15, wherein the memory comprises a buffer for each respective component.

* * * * *